United States Patent
Zocholl

[15] 3,656,026
[45] Apr. 11, 1972

[54] SOLID STATE OVERCURRENT DEVICE WITH VARIABLE FREQUENCY REFERENCE

[72] Inventor: Stanley E. Zocholl, Holland, Pa.
[73] Assignee: I-T-E Imperial Corporation, Philadelphia, Pa.
[22] Filed: Mar. 12, 1971
[21] Appl. No.: 123,771

[52] U.S. Cl..........................317/36 TD, 317/33 R, 307/129, 307/295
[51] Int. Cl.........................................................H02h 3/08
[58] Field of Search............317/36 TD, 33 R; 307/129, 295; 328/134; 340/253 A, 253 Y

[56] References Cited

UNITED STATES PATENTS

| | | | |
|---|---|---|---|
| 3,319,127 | 5/1967 | Zocholl | 317/36 TD |
| 3,573,555 | 2/1969 | Lipnitz | 317/36 TD |
| 3,544,846 | 12/1970 | Thompson | 317/36 TD |

Primary Examiner—J. D. Miller
Assistant Examiner—Harvey Fendelman
Attorney—Ostrolenk, Faber, Gerb & Soffen

[57] ABSTRACT

A solid state overcurrent relay is operated from saturating current transformers which generate output voltages which are responsive to the current in a system being monitored. A pickup circuit is operated when the monitored current exceeds a given value and initiates a timing operation by charging an RC circuit. As the voltage of the RC circuit reaches a given value as compared to a reference voltage circuit, a semiconductor switch is operated, thereby to initiate a control operation. Both the pickup level and the output voltage of the timing circuit are compared to reference voltages. The reference voltage is varied in accordance with the frequency of the output sensors so that pickup and timing become relatively independent of frequency variations in the circuit being monitored.

9 Claims, 13 Drawing Figures

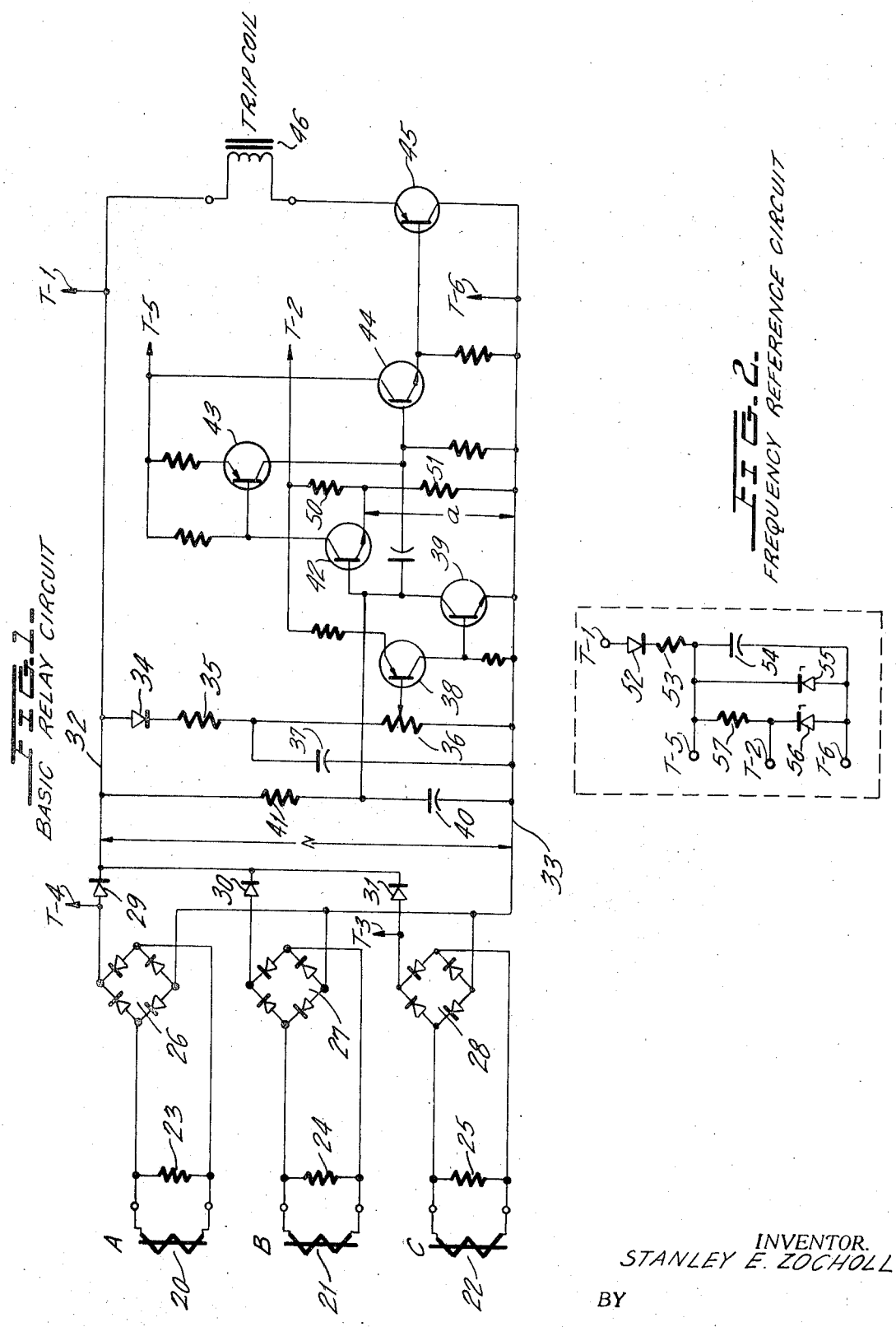

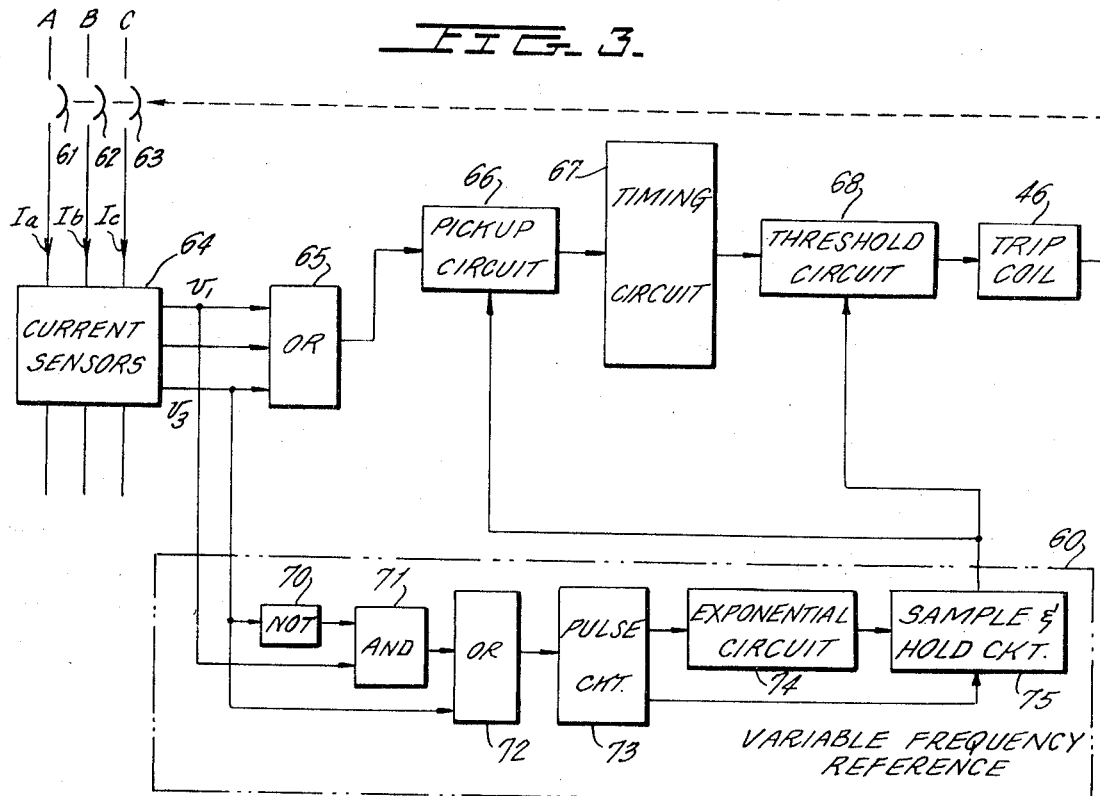
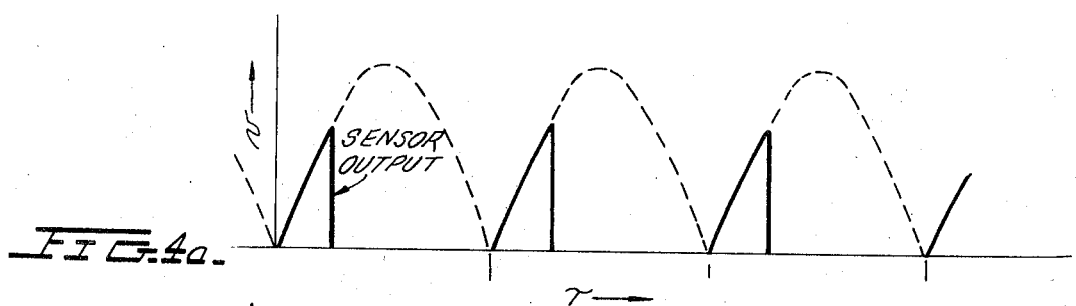
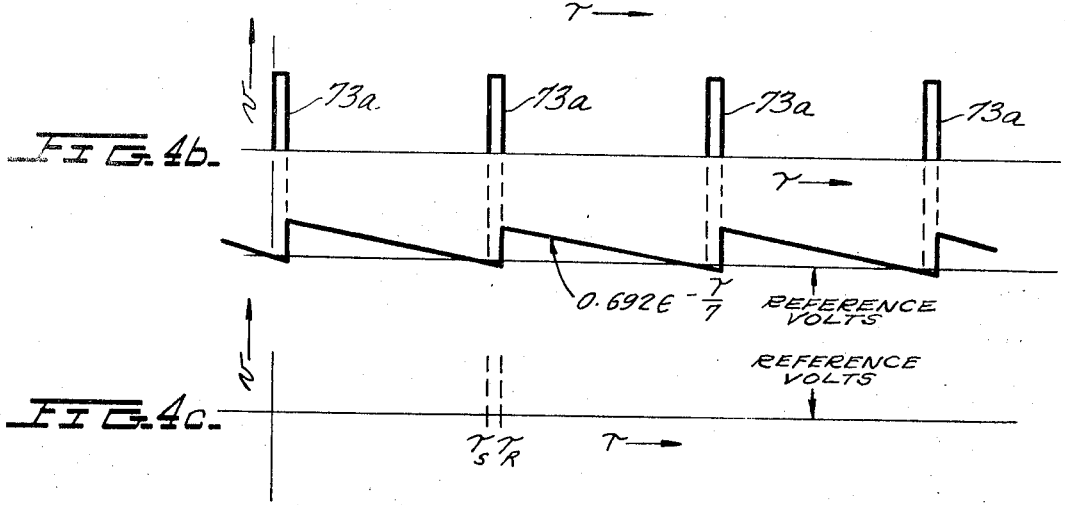
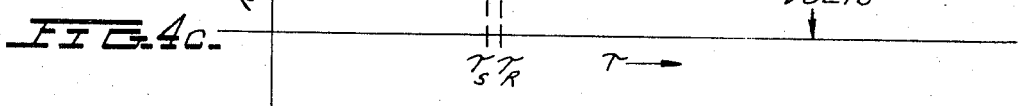

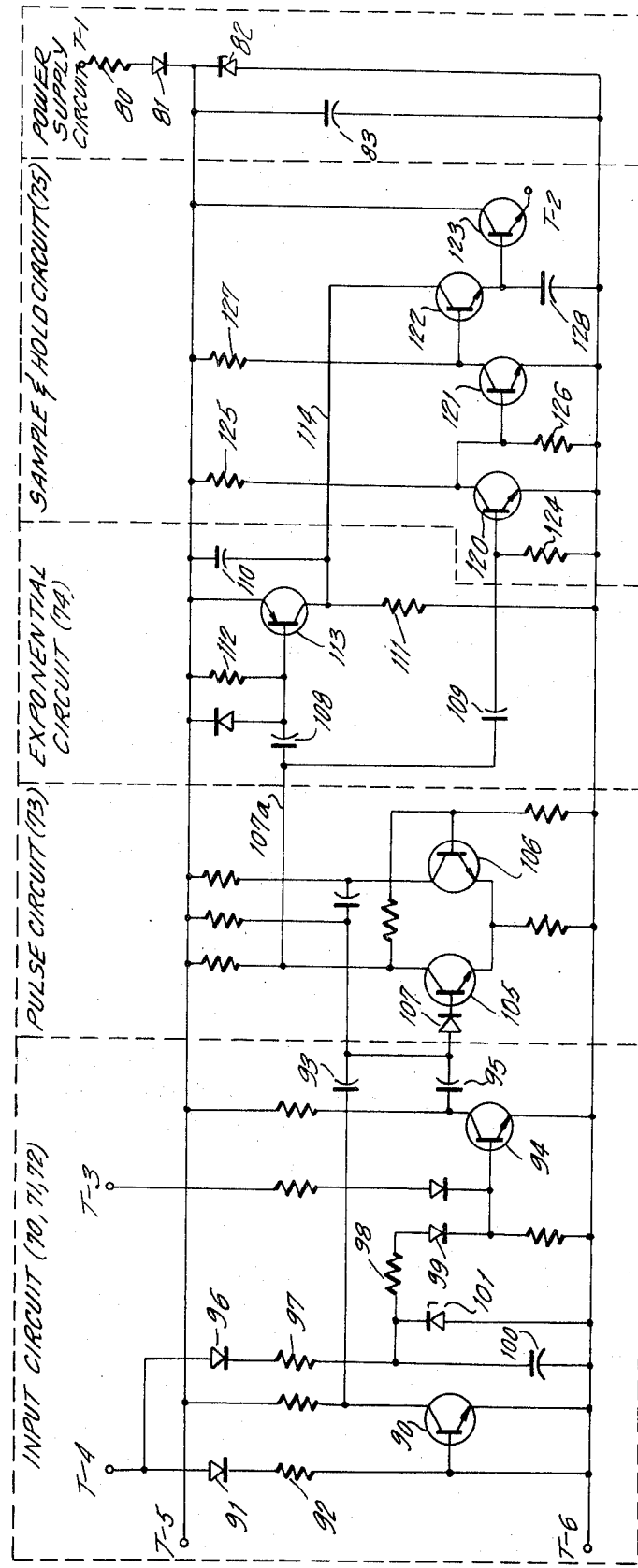

CURRENT SENSOR OUTPUT AT 60, 30, & 15 Hz

ACTUAL PICKUP VS. PICKUP SETTING AT 60 & 15 Hz

CHANGE IN TIME CURRENT RESPONSE FROM 60Hz TO 15Hz

INVENTOR
STANLEY E. ZOCHOLL
BY Ostrolenk, Faber, Gerb & Soffen
ATTORNEYS

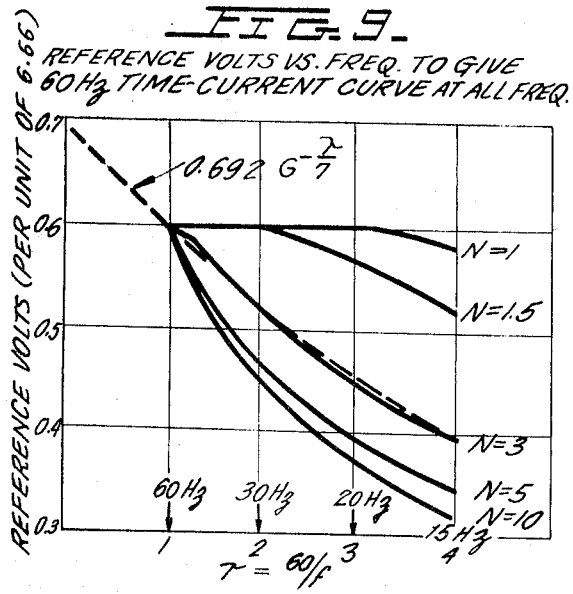
FIG. 9 — REFERENCE VOLTS VS. FREQ. TO GIVE 60Hz TIME-CURRENT CURVE AT ALL FREQ.
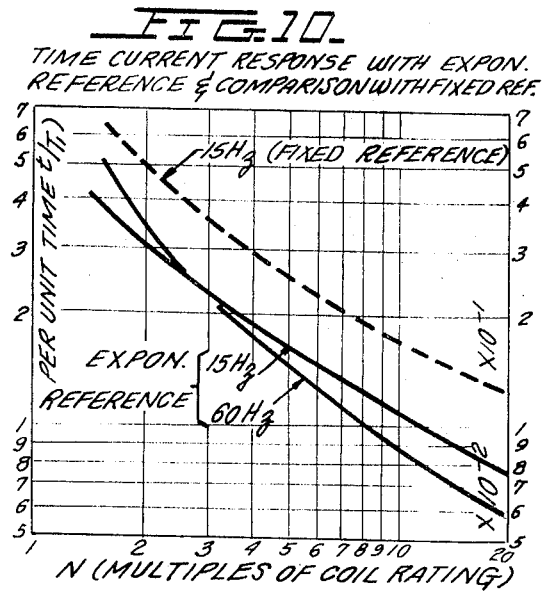
FIG. 10 — TIME CURRENT RESPONSE WITH EXPON. REFERENCE & COMPARISON WITH FIXED REF.
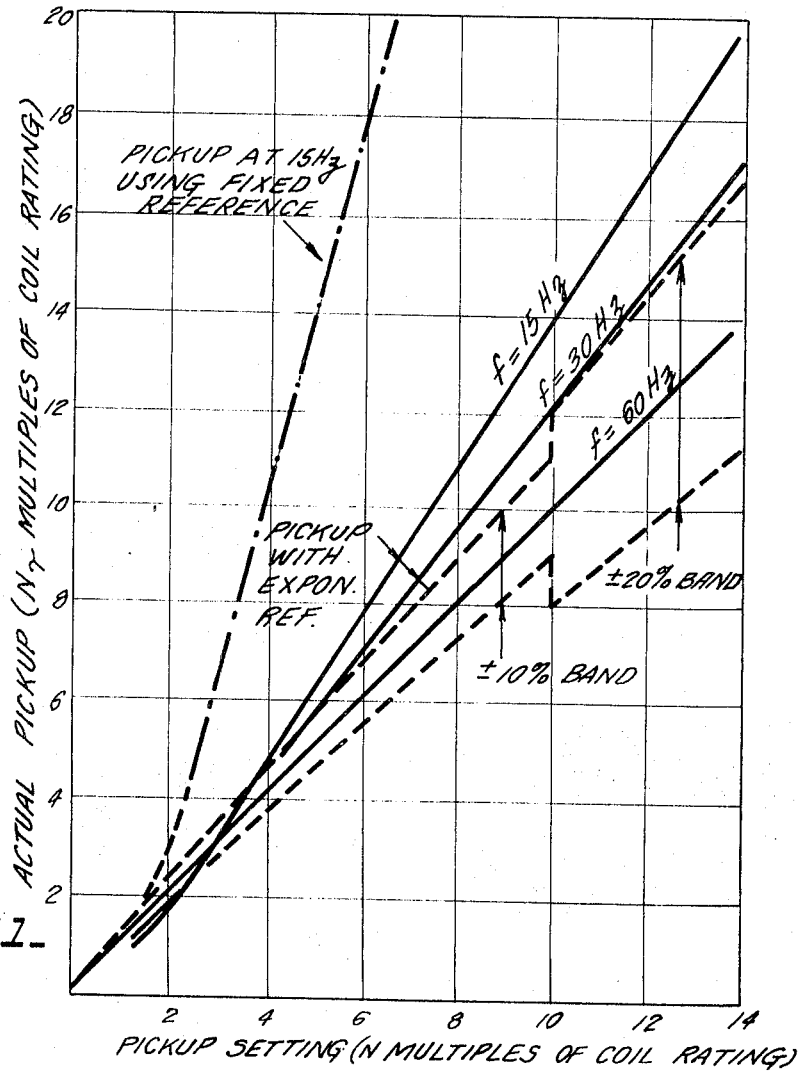
FIG. 11

SOLID STATE OVERCURRENT DEVICE WITH VARIABLE FREQUENCY REFERENCE

BACKGROUND OF THE INVENTION

This invention relates to solid state relay systems, and more specifically relates to a novel solid state relay system which is operable independently of frequency changes in the system being monitored. In particular, the voltage reference circuit provided for the solid state relay has a variable output dependent upon the frequency of the circuit being monitored.

THE PRIOR ART

Solid state overcurrent relays are well known, and are shown typically in U. S. Pat. No. 3,319,127, in the name of Zocholl et al., issued May 9, 1967. The device of that patent is a direct acting relay in the sense that the energy, which initiates the tripping of the circuit breaker controller by the relay, is supplied by specially designed current transformers. Since the tripping energy is derived from fault current, no external source of control power is required for the circuit.

Since overcurrent relays are commonly applied to protect power circuits in which the available fault current may be many orders of magnitude greater than the pickup current of the relay, it is necessary to limit the output voltage of the current transformers to a safe value under high current faults in order to prevent damage to the solid state circuit due to overvoltage. My U. S. Pat. No. 3,434,011, issued March 18, 1969, discloses a construction for the current transformers whereby the current transformers saturate at relatively low multiples of the relay pickup current, thereby producing a safe maximum voltage over a wide range of fault current. My U. S. Pat. No. 3,444,434, issued May 13, 1969, shows a circuit using saturated current transformers of the type shown in U. S. Pat. No. 3,434,011, where the former patent shows the manner in which the saturated waveform is used for the control of the time-current characteristics of the relay.

Thus, the above-noted patents generally disclose a direct acting solid state tripping device which uses saturating current transformers which supply the operating signals to the solid state circuitry, and at the same supply the tripping energy for the output device without the need for additional transformers or control power. This produces an economical and relatively small device which can be mounted as an integral part of a circuit breaker.

The above devices, however, do not respond properly when the frequency of the monitored voltage or current varies over a wide range. Thus, there are applications where the frequency of the generated voltage in a power system varies. For example, system frequency might vary from 10 hertz to 60 hertz in order to control the speed of a motor. This change in system frequency, however, has a drastic effect on the output of the saturating current transformer, and, consequently, on the time-current response of the circuit connected to the current transformer.

BRIEF SUMMARY OF THE INVENTION

The object of the present invention is to produce a solid state reference circuit which will automatically compensate for the change in response of the saturating sensors to changes in system frequency. Thus, by using an automatically adjusted reference circuit, it is possible to preserve the use of the saturating principle for the construction of compact direct-acting solid state overcurrent trip devices in variable frequency power systems. In particular, and in accordance with the invention, the reference voltage which is used to determine the voltage at which a pickup circuit will operate and the threshold voltage at which the timing circuit can operate a tripping coil vary exponentially with the frequency of the current sensor or current transformer output.

BRIEF DESCRIPTION OF THE DRAWINGS

FIG. 1 schematically illustrates a basic solid state relay circuit which can incorporate a variable frequency reference circuit constructed in accordance with the invention.

FIG. 2 schematically illustrates a fixed frequency reference circuit of a prior art type which could be connected to the relay circuit of FIG. 1.

FIG. 3 is a block diagram illustrating a novel variable frequency reference circuit incorporated with the type of basic relay circuit shown in FIG. 1.

FIGS. 4a, 4b and 4c illustrate sensor output, pulse circuit output and exponential circuit output, respectively, for the circuit of FIG. 3 when plotted on a common time base.

FIG. 5 is a detailed circuit diagram of a variable frequency reference circuit which could be used in connection with FIG. 1, and is constructed in the manner schematically illustrated in FIG. 3.

FIG. 9 illustrates the desired change in reference voltage as a function of frequency for various values of fault current magnitude which will produce a 60 hertz time-current curve at all frequencies.

FIG. 10 illustrates the time-current response as a function of N when using an exponential reference for two different frequencies.

FIG. 11 schematically illustrates actual pickup values for different frequencies when using the exponential reference voltage of the present invention.

DETAILED DESCRIPTION OF THE INVENTION

Figure 6:
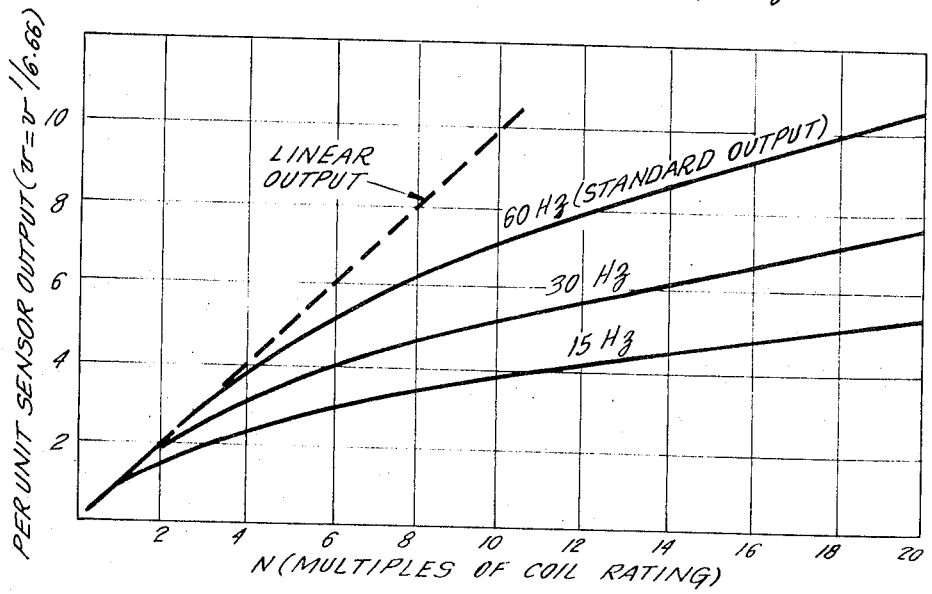
FIG. 6 illustrates the per unit sensor output as a function of the ratio N of actual coil current to rated coil current for different frequencies when using a fixed reference frequency in the circuit of FIGS. 1 and 2.

FIG. 1 schematically illustrates a basic relay circuit without a reference circuit therefor, but showing the terminals for the connection of a reference circuit. It will be noted that the circuit of FIG. 1 is essentially identical to the circuit of FIG. 3 of Zocholl et al., U. S. Pat. No. 3,319,127, where the circuit of that patent is adapted to have a fixed frequency reference circuit generally similar to the circuit shown in FIG. 2 herein. Thus, in FIG. 1, the circuit illustrated is provided with current transformers or current sensors 20, 21 and 22 which are appropriately coupled to phases A, B and C of a multiphase power system. The current transformers 20, 21 and 22 are then provided with appropriate burden resistors 23, 24 and 25, respectively, and are connected to the a-c terminals of single phase bridges 26, 27 and 28, respectively. The positive terminals of each of bridges 26, 27 and 28 are then connected through diodes 29, 30 and 31, which define an "OR" circuit, to a positive bus 32. The negative terminals of bridges 26, 27 and 28 are connected together and to the negative bus 33.

A pickup circuit is then formed which includes the diode 34, resistor 35, adjustable resistor 36 and the filter capacitor 37. This circuit operates to control the conduction of transistor 38 such that the transistor 38 switches between conduction and nonconduction when the output voltage between buses 32 and 33 exceeds some given voltage, related to a given current in phases A, B and C. The change in conduction of transistor 38, in turn, shuts off the normally conducting transistor 39, thereby to permit the charging of capacitor 40 of the timing circuit which consists of the capacitor 40 and resistor 41. It will be noted that the circuit shown in FIG. 3 of U. S. Pat. No. 3,319,127 illustrates a resistance-capacitance network for the timing circuit while the timing circuit shown herein in FIG. 1 consists solely of the single capacitor 40 and single resistor 41.

The output voltage appearing across capacitor 40 in FIG. 1 is then connected into a trip circuit which is a low current drain circuit consisting of transistors 42, 43 and 44 and their appropriate coupling resistors and capacitors. The output of transistor 44 controls the base of a power transistor 45 which is connected in series with trip coil 46 of a circuit breaker (not shown), connected in series with the conductors of phases A, B and C which receive the current transformers 20, 21 and 22.

FIG. 1 further illustrates six terminal connections to the circuitry for receiving reference circuit voltage. These terminals are indicated by arrows T-1 to T-6. Terminals T-1 and T-6 are connected to the buses 32 and 33; terminal T-2 is connected to the emitter of transistor 38 and is connected in series with resistors 50 and 51; terminals T-3 and T-4 are connected to the positive terminals of bridges 26 and 28, respectively; and terminal T-5 is connected to the collector of transistor 44.

FIG. 2 illustrates a typical fixed frequency reference circuit which can be connected to the terminals T-1, T-2, T-5 and T-6. It will be noted that this fixed frequency reference circuit differs slightly from that shown in FIG. 3 of U. S. Pat. No. 3,319,127 in that it provides two levels of reference voltage to terminals T-2 and T-5, respectively, rather than fixing them both to the same reference voltage as in the patent.

As shown in FIG. 2, there is connected between terminals T-1 and T-6 and buses 32 and 33 the diode 52 (which makes the circuit peak-detecting), the current limiting resistor 53 and filter capacitor 54. A fixed zener diode 55 is then connected between terminals T-5 and T-6 to establish a first reference voltage which establishes the voltage which must be reached in capacitor 40 before the controlled rectifier 45 becomes conductive.

The circuit of FIG. 2 further provides a second zener diode 56 in series with resistor 57, where the voltage across zener diode 56 is connected between terminal T-2 and T-6. This reference voltage establishes the pickup voltage at which transistor 38 of FIG. 1 becomes conductive to turn off transistor 39, thereby to initiate the timing operation of capacitor 40.

The operation of the circuit of FIGS. 1 and 2 is described in detail in the above-noted U. S. Pat. No. 3,319,127 and the use of saturating current sensors for the current transformers 20, 21 and 22 is further well described in previously referred to U. S. Pat. Nos. 3,434,011 and 3,444,434.

BEHAVIOR OF PRIOR ART CIRCUIT OF FIGURES 1 AND 2 WITH VARIABLE FREQUENCY INPUT

The circuit of FIGS. 1 and 2 is designed to operate on a D.C. voltage between buses 32 and 33 which is representative of the peaks of the A.C. voltage from the current sensors 20, 21 and 22. Where the current sensor are of the saturating type, it can be shown that the output voltage V between buses 32 and 33 is of the following form:

$$0 < N < N_S \quad v = NV_{11}$$

$$N_S < N \quad v = V_{11} 2 N_S \left\{ N - \frac{N_s}{2} \right\}^{1/2} \quad (1)$$

In the above, $v$ is the sensor output peak voltage, N is the ratio of the primary current monitored in phases A, B and C to the current sensor primary current rating, $N_S$ is the multiple of N at which saturation occurs for the current sensors, and $V_{11}$ is the value of the sensor output voltage for the rated primary current.

The ratio $N_S$ can be shown to be proportional to the frequency of phases A, B and C or to the frequency of the voltage being monitored by the current sensor which may have any desired form. The effect of frequency on the sensor output voltage can be shown by introducing the frequency variable period $\tau$ which is equal to $60/f$, where $f$ is frequency. Thus $\tau$, will vary from 1 to 4, as $f$ varies from 60 to 15 hertz. In addition to introducing $\tau$ into the above voltage output equation, it is convenient to assign values to $N_S$ and $V_{11}$ to review numerical results with frequency changes. Assume, therefore, that $N_S$ is 3 and $V_{11}$ is 1. Obviously, any other desired values could have been selected.

The above Equation (1) will now become:

$$0 < N < \frac{3}{\tau} \quad v = N$$

$$\frac{3}{\tau} < N \quad v = \left[ \frac{6}{\tau}\left(N - \frac{1.5}{\tau}\right) \right]^{1/2} \quad (2)$$

The current sensor output voltage $v$ from the above equation is plotted in FIG. 6 as a function of N for 3 frequencies, 15, 30 and 60 hertz. FIG. 6 also demonstrates a linear output for the sensor in dotted lines. It will be observed that there is a drastic decrease in sensor voltage output with decreasing frequency. In addition to a marked decrease in sensor output voltage, it will also be seen that there is a marked change in the time-current response of the circuit for different frequencies. Thus, the time-current response of the static circuit is given by:

$$\frac{t}{T_1} = \ln \frac{v}{v-a} \quad (3)$$

Where the ratio $t/T_1$ is per unit time, $t$ is time in seconds, $T_1$ is the time constant of the timing circuit (the product of the resistance and capacitance of resistor 41 and capacitor 40 in FIG. 1), $v$ is the sensor voltage determined by Equation (2) above, and $a$ is the reference voltage against which the voltage on capacitor 40 of FIG. 1 is compared. Note that the voltage $a$ in FIG. 1 is developed across resistor 51, whereby the transistor 42 becomes conductive when its base voltage, determined by transistor 40, reaches the voltage set on the emitter of transistor 42 by the voltage drop across resistor 41.

Figure 7:
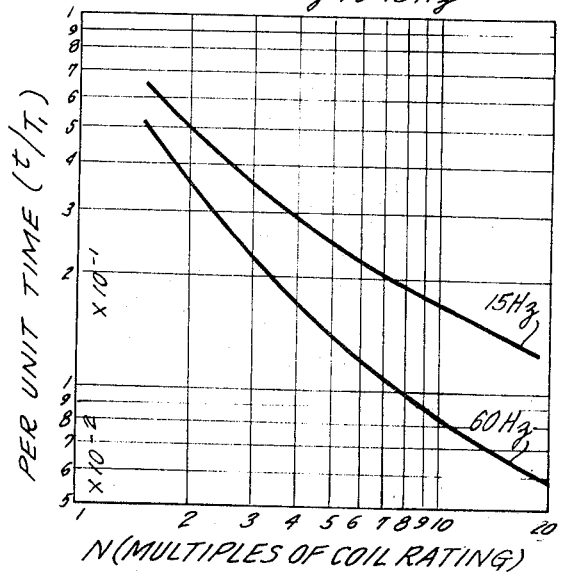
FIG. 7 schematically illustrates the change in the time-current response for the timing circuit of FIG. 1 as a function of N using a fixed frequency reference circuit of the type shown in FIG. 2.

The quantity $t/T_1$ or per unit time for the timing circuit in FIG. 1 as determined by Equation (3) above is shown in FIG. 7, where the voltage $a$ is set equal to 0.6 for frequencies of 60 and 15 hertz. It will be observed that the time required to reach the value 0.6 at N equal to 20 is about double the time required to reach the voltage $a$ at the frequency of 60 hertz. Thus, there is a marked change in the response of the timing circuit for frequency changes in the input or monitored circuit when using a fixed reference voltage $a$ in the reference voltage circuit.

DETERMINATION OF NECESSARY FREQUENCY COMPENSATION

Figure 8:
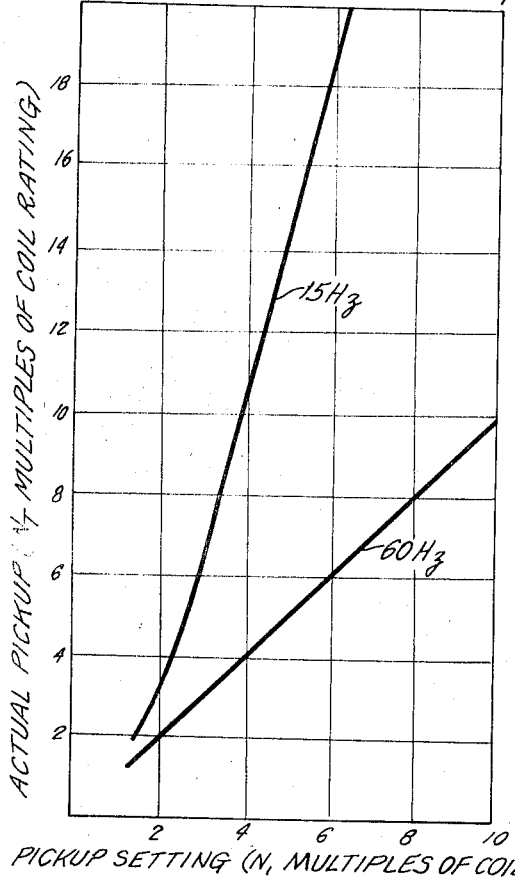
FIG. 8 illustrates the actual pickup point as a function of pickup setting for different frequencies when using the circuit of FIGS. 1 and 2.

When the static relay is set to pickup at a given current, the fixed reference represents the voltage produced by the sensor at that value of current. Consequently, the pickup current at a given frequency is determined by first finding the voltage that occurs at pickup at 60 hertz and then finding at what current this voltage occurs at the new frequency. The results of this process are:

$$\left. \begin{array}{c} 0 < N < 3 \\ \dfrac{3}{\tau} < N_2 \end{array} \right\} N_\tau = \frac{\tau}{6} N_1^2 + \frac{1.5}{\tau} \quad (4)$$

$$\left. \begin{array}{c} 3 < N_1 \\ \dfrac{3}{\tau} < N_\tau \end{array} \right\} N_\tau = \tau(N_1 - 1.5) + \frac{1.5}{\tau} \quad (5)$$

Where $N_I$ is the pickup current in multiples of sensor rating at 60 hertz and $N_\tau$ is the pickup current in multiples of sensor rating at the desired frequency. Actual pickup current versus pickup setting is plotted in FIG. 8 for 60 hertz and 15 hertz.

These results show that frequency compensation means must be used with the static circuitry to obtain acceptable time-current and pickup response over a wide frequency range.

The adverse effects of changing frequency could be minimized if the reference voltage $a$, instead of remaining fixed, were to decrease as a function of frequency.

To find the necessary relation between the reference and frequency let $\tau v_1$ and $a_1$ be the sensor voltage and reference at normal frequency (i.e. $\tau = 1$ where $\tau = 60/f$) and $v_\tau$ and $a_\tau$ be the sensor voltage and reference at another frequency. The trip time at $\tau = 1$ is:

$$t/T_1 = \ln (v_1/v_1 - a_1)$$

and the time at another $\tau$ would be:

$$\frac{t}{T_1} = \ln \frac{v_\tau}{v_\tau - a_\tau}$$

These two times should be equal. Therefore $$\frac{v_1}{v_1 - a_1} = \frac{v_\tau}{v_\tau - a_\tau}$$

Therefore $$a_\tau = \frac{v_\tau}{v_1} a_1 \quad (6)$$

Consideration of Equations (2) and (6) give the following equations for the ideal variable frequency reference:

$$0 < N < \frac{3}{\tau} \quad a_\tau = 0.6 \frac{\left[\frac{6}{\tau}\left(N - \frac{1.5}{\tau}\right)\right]^{1/2}}{N}$$

$$\frac{3}{\tau} < N < 3 \quad a_\tau = 0.6$$

$$3 < N \quad = 0.6 \frac{\left[\frac{1}{\tau}\left(N - \frac{1.5}{\tau}\right)\right]^{1/2}}{N - 1.5}$$

This relation is plotted in FIG. 9.

Unfortunately, the relation changes in three regions of N and in addition the reference must be a function of N as well as frequency.

EXPONENTIAL REFERENCE

An acceptable compensating circuit must conserve the 60 hertz response. There, from FIG. 9, the reference must equal 0.6 at $\tau = 1$. This can be done by approximating one of the curves of FIG. 9 with an exponential curve.

The exponential, $0.692 \epsilon^{-\frac{1}{\tau}}$, shown dashed in FIG. 9, closely fits the desired reference for N = 3. If the RC timing circuits and pickup circuits were to follow this exponential, the 60 hertz response would be conserved for all N and for N = 3, at all frequencies. Although at $N \neq 3$ and $f \neq 60$ hertz there is deviation, this exponential gives substantial correction.

TIME-CURRENT RESPONSE WITH EXPONENTIAL REFERENCE

When the exponential reference replaces the fixed reference, the time-current function of Equation (3) becomes:

$$\frac{t}{T_1} = \ln \frac{v}{v - 0.692\epsilon^{-\frac{\tau}{7}}} \quad (8)$$

where $\tau = 60/f$ and v is given by equation (2). FIG. 10 shows the frequency corrected time-current plot with the fixed reference 15 hertz plot for comparison.

PICKUP RESPONSE WITH EXPONENTIAL REFERENCE

The relation for pickup using the exponential reference are given by:

$$\left. \begin{array}{l} 0 < N_1 < 3 \\ N_\tau < \frac{3}{\tau} \end{array} \right\} N_\tau = N_1 e^{-\frac{1}{7}(\tau-1)}$$

$$\left. \begin{array}{l} 0 < N_1 < 3 \\ \frac{3}{\tau} < N_\tau \end{array} \right\} N_\tau = \frac{\tau}{6} N_1^2 \epsilon^{-\frac{2}{7}(\tau-1)} + \frac{1.5}{\tau}$$

$$\left. \begin{array}{l} 3 < N_1 \\ \frac{3}{\tau} < N_\tau \end{array} \right\} N_\tau = \tau(N_1 - 1.5)\epsilon^{-\frac{2}{7}(\tau-1)} + \frac{1.5}{\tau} \quad (9)$$

This relation is plotted in FIG. 11 along with pickup with fixed reference to show the amount of correction.

VARIABLE FREQUENCY REFERENCE CIRCUIT

A reference circuit for producing the exponential reference as a function of frequency is shown in block diagram fashion in FIG. 3 and is labeled V.F.R. consisting of the circuitry within the dotted block 60. The variable frequency reference circuit 60 is then coupled to the basic relay circuitry which is also shown in block diagrammatic fashion. Thus, there is illustrated in FIG. 3 the phases A, B and C of FIG. 1 where these phases are shown as containing the poles 61, 62 and 63 of a circuit breaker having the trip coil 46 (also see FIG. 1) connected to operate the poles as shown by the dotted line connection.

The phase currents $I_a$, $I_b$ and $I_c$ are then led into the current sensors 64 which could consist, for example, of individual saturating current transformers. The output of current sensors 64 are then applied to an OR circuit 65 (formed in FIG. 1 by diodes 29, 30 and 31). The output of OR circuit 65 will then include outputs of at least two phases, thereby to guarantee a signal from any fault condition on an ungrounded system. The output of OR circuit 65 is applied to pickup circuit 66 which is, in turn, coupled to the timing circuit 67 which, in turn, operates the threshold circuit 68. Obviously, pickup circuit 66 will include transistors 38 and 39 of FIG. 1; timing circuit 67 would include capacitor 40 and resistor 41 of FIG. 1, and threshold circuit 68 would include transistors 42, 43 and 44 and device 45 which could be a controlled rectifier or the like.

The variable frequency reference circuit 60 then supplies a reference voltage against which pickup circuit 66 may operate and against which threshold circuit 68 may operate.

The reference circuit 60 generates a reference voltage which varies exponentially with the frequency of the output of current sensors 64. Thus, output signals from two phases shown as voltage $V_1$ and $V_3$ are connected as illustrated through the NOT circuit 70, the AND circuit 71 and the OR circuit 72.

As shown in FIG. 4a, the output of OR circuit 72 is illustrated as the sensor output in solid lines, as compared to the dotted line voltage v which is representative of either voltage $v_1$ or $v_3$ in FIG. 3. This output produces from the pulse circuit 73 a pulse of fixed width shown in FIG. 4b as the representative pulse 73a which is, in turn, applied to an exponential producing circuit 74 and a sample and hold circuit 75. As will be described more fully hereinafter, the pulse output of circuit 73 causes the repetitive recycling of an exponential voltage output. In particular, upon the receipt of the trailing edge of pulse 73a, the exponential is automatically reset, for example, to 0.692 per unit volts and then decays from that value in the exponential manner desired. The sample and hold circuit 75 is actuated by the leading edge of the next pulse and thereby samples the instantaneous value of the exponential decaying output of circuit 74. The sample and hold circuit 75 then delivers a reference output voltage which is representative of the instantaneous voltage output of the decaying exponential at the time of receipt of a leading edge of pulse 73a.

Accordingly, as the period $\tau$ increases, for example, the output of the exponential circuit decreases more and more so that when it is sampled, the lower reference voltage output is produced from the output and sampling and hold circuit 75. In particular, the time between pulses 73a will be half the period of the input current sine wave in FIG. 4a. Consequently, the sample taken on the decaying exponential at a point dependent on system frequency is shown in FIG. 4c. Thus, the reference voltage so derived and labeled in FIG. 4c becomes the reference for the pickup circuit 66 and threshold circuit 68 in FIG. 3.

FIG. 5 shows one specific variable frequency reference circuit which can be connected directly to the basic relay circuitry of FIG. 1 at the variously labeled terminals T-1 to T-6. It will be noted that the detailed circuit of FIG. 5 has been generally divided into blocks by the dotted lines which define the input circuit consisting in FIG. 3 of circuits 70, 71 and 72, the pulse circuit 73, the exponential circuit 74 and the sample and hold circuit 75.

The circuit of FIG. 5 further includes a self-contained power supply circuit which derives the necessary power supply for the reference voltage circuit from the current sensors. More specifically, the power supply circuit is shown to the right in FIG. 5 and includes current limiting resistor 80, diode 81, zener diode 82 and filter capacitor 83. This circuit, which is connected between terminals I-1 and T-6 and then between buses 32 and 33 in FIG. 1, establishes a regulated d-c voltage for the remaining circuitry in FIG. 5.

The input circuit shown to the left in FIG. 5 receives the rectified but unfiltered output voltage from sensors 20 and 22 in FIG. 1 at terminals T-4 and T-3, respectively, and produces the signal needed for driving pulse circuit 73. The signal from phase A connected to terminal T-4 drives transistor 90 through the diode 91 and resistor 92. When the phase A voltage is positive, transistor 90 turns on. Consequently, the collector voltage of transistor 90 becomes a positive voltage pulse at a point in time corresponding to the point of commutation of the phase A voltage waveform with the conduction of an adjacent phase. This pulse is then connected to pulse circuit 73 through capacitor 93.

The phase C voltage drives transistor 94 in a similar manner to that of transistor 90 and the voltage at the collector of transistor 94 is coupled to the pulse circuit 73 by capacitor 95. Note that transistor 94 is also driven by the signal at terminal T-4 in phase A through diode 96 and resistors 97, 98 and 99. In addition, capacitor 100 is charged to the fixed voltage of zener diode 101. After the voltage of phase A at terminal T-4 goes to zero, the charge on capacitor 100 will leak off to the base of transistor 94 through the resistor 98.

The time constant of this RC circuit is long enough to keep transistor 94 conductive for half the period of the lowest frequency sine wave to be encountered in phases A, B and C. Consequently, transistor 94 remains on as long as phase A voltage is present and no signal is coupled through capacitor 95 to the pulse circuit 73. Therefore, on a fault where signals from both phases A and C are present, phase A alone drives the pulse circuit 73. If a fault is measured on only one of phase A or phase C at terminal T-4 or T-3, respectively, that signal will drive the pulse circuit 73. Thus, the functions of blocks 70, 71 and 72 of FIG. 3 are carried out by the detailed input circuit of FIG. 5.

The pulse circuit 73 in FIG. 5 consists essentially of a conventional one-shot multivibrator formed by transistors 105 and 106. Suitable connecting resistors and capacitors and a coupling diode 107 are provided, as desired, and as will be obvious to any circuit designer.

The function of pulse circuit 73 is to receive a pulse from the input circuit over diode 107 and to produce therefrom a pulse output having a standard width. This pulse output is conducted over conductor 107a to the exponential circuit 74 and to the sample and hold circuit 75 (through coupling capacitors 108 and 109, respectively). More specifically, the standard output pulse is derived from the collector of transistor 105, this pulse occurring at a point in time corresponding to the positive-going edge of the input voltage of a sensor, as shown in FIGS. 4a and 4b.

The exponential circuit 74 consists of capacitor 110, resistors 111 and 112 and transistor 113. The function of the exponential circuit 74 is to produce an output voltage on output lead 114 which decays exponentially from a standard value to a value determined by the system frequency. Thus, on the trailing edge of the standard pulse output of pulse circuit 73, a pulse current passes through the base of PNP transistor 113 through capacitor 108. This momentarily turns on transistor 106 which discharges capacitor 108. This, in turn, causes the voltage across resistors 112 and 111 to become the power supply voltage.

When transistor 113 turns off, capacitor 110 starts to charge exponentially. Consequently, the voltage across resistors 111 and 112 decays exponentially. This voltage is the output voltage of the exponential circuit at output lead 114. Note that the standard pulse from pulse circuit 73 occurs once in each half period of the input sine wave. Consequently, the exponential output voltage of circuit 74 will decay to a value depending upon system frequency and will be reset each half cycle.

The function of the sample and hold circuit 75 is to sample the exponential circuit voltage at lead 114 just before it is reset. Thus, the sampled voltage will be a function of system frequency. The sample and hold circuit 75 consists of transistors 120 to 123, resistors 124 to 127 and capacitor 128.

In operation, and when the leading edge of the standard pulse is passed through capacitor 109, transistor 120 momentarily turns on to momentarily turn off transistor 121. This momentarily turns on transistor 122 to transfer the exponential voltage at this instant of time to capacitor 128. This storing action occurs on the leading edge of the standard pulse from pulse circuit 73 while the reset of the exponential voltage occurs on the trailing edge of such pulses. Consequently, the sample is taken just prior to reset. The stored voltage on capacitor 128 is then the variable frequency reference which is fed through power amplifying transistor 123 which is applied to the pickup and threshold circuits of the basic relay circuit at terminal T-2 connected to the emitter of transistor 123. Thus, in accordance with the invention, the reference voltage which is used to set the operation of the pickup circuit and of the timing circuit in the basic relay circuit of FIG. 1 will vary exponentially with the frequency of the main power signal monitored by current sensors 20, 21 and 22.

Although there has been described a preferred embodiment of this invention, many variations and modifications will now be apparent to those skilled in the art. Therefore, this invention is to be limited not by the specific disclosure therein, but only by the appended claims.

The embodiments of the invention in which an exclusive privilege or property is claimed are defined as follows:

1. A solid state relay for monitoring a variable frequency electrical circuit; said solid state relay comprising, in combination:
   current sensor means coupled to said electrical circuit for generating an output electrical signal representative of a given electrical parameter of said electrical circuit;
   a timing circuit means coupled to said current sensor means for generating an output signal which changes toward a first output signal level with increasing time;
   a pickup circuit coupled to said current sensor means and said timing circuit means for preventing the operation of said timing circuit means until the output signal of said current sensor means reaches a second output signal level;
   an output threshold signal circuit means connected to said timing circuit means for generating an output signal responsive to the condition whereby said timing circuit means output reaches said first output signal level;
   and a reference circuit for generating an output reference signal level which varies as a function of the frequency of said variable frequency electrical circuit; said output reference signal being coupled to said output threshold signal circuit means for establishing said first output signal level and for varying said first output signal level as a function of the frequency of said variable frequency electrical circuit.

2. The relay of claim 1 wherein said output reference signal level is further coupled to said pickup circuit for establishing said second output signal level, and for varying said second output signal level as a function of the frequency of said variable frequency electrical circuit.

3. The relay of claim 1 wherein said current sensor means includes a current transformer which saturates at a given value of instantaneous current in said electrical circuit.

4. The relay of claim 2 wherein said current sensor means includes a current transformer which saturates at a given value of instantaneous current in said electrical circuit.

5. The relay of claim 1 wherein the magnitude of said output reference signal level varies exponentially with the frequency of said electrical circuit.

6. The relay of claim 2 wherein the magnitude of said output reference signal level varies exponentially with the frequency of said electrical circuit.

7. The relay of claim 1 which includes a power supply circuit connected to said timing circuit means, pickup circuit, output threshold signal circuit means and reference circuit; said power supply circuit being connected to and energized solely from the output of said current sensor means.

8. The relay of claim 2 which includes a power supply circuit connected to said timing circuit means, pickup circuit, output threshold signal circuit means and reference circuit; said power supply circuit being connected to and energized solely from the output of said current sensor means.

9. A variable frequency reference circuit for a solid state relay; said solid state relay comprising current sensor means connectable to an electrical circuit, and circuit means for generating an output signal responsive to a given overcurrent condition in said electrical circuit for a time longer than a given length of time; said circuit means containing input terminal means connectable to a reference voltage circuit whereby the voltage of said reference voltage circuit determines the overcurrent magnitude required and the length of time said overcurrent condition exists for generating said output signal; said reference voltage circuit being coupled to said current sensor means and generating an output reference voltage having a magnitude related to the frequency of said electrical circuit, whereby the tripping current and time characteristics of said solid state relay are automatically varied in accordance with the frequency of said electrical circuit.

* * * * *